United States Patent [19]

Raidel

[11] Patent Number: 4,596,402
[45] Date of Patent: Jun. 24, 1986

[54] WIDE BASE AIR SPRING SUSPENSION WITH UNITIZED PARALLELOGRAM STABILIZATION

[76] Inventor: John E. Raidel, Rte. 1, Box 400-N, Springfield, Mo. 65804

[21] Appl. No.: 570,794

[22] Filed: Jan. 16, 1984

Related U.S. Application Data

[63] Continuation-in-part of Ser. No. 502,496, Aug. 29, 1983, Pat. No. 4,529,224, which is a continuation of Ser. No. 266,006, May 21, 1981, abandoned.

[51] Int. Cl.$^4$ ............................................. B60G 11/32
[52] U.S. Cl. ..................................................... 280/711
[58] Field of Search ............... 280/683, 685, 688, 689, 280/702, 711, 713, 724, 725, 781, 788, 104

[56] References Cited

U.S. PATENT DOCUMENTS

| 2,903,256 | 9/1959 | Weiss | 280/711 |
| 3,154,321 | 10/1964 | McLean | 280/713 |
| 3,252,538 | 5/1966 | Brueder | 280/711 |
| 3,565,456 | 2/1971 | Zoltok | 280/711 |

FOREIGN PATENT DOCUMENTS

| 2056634 | 5/1972 | Fed. Rep. of Germany | 280/711 |
| 566667 | 9/1957 | Italy | 280/711 |

Primary Examiner—Joseph F. Peters, Jr.
Assistant Examiner—Ross Weaver
Attorney, Agent, or Firm—Rogers, Howell, Moore & Haferkamp

[57] ABSTRACT

A suspension assembly for supporting a vehicle chassis from at least one vehicle axle has a pair of outrigger bracket members extending into the wheel house area of the chassis, a bolster beam bolted to the axle with outrigger members extending into the wheel house area of the chassis and aligned with the outrigger brackets, and an air spring mounted and extending between each of the outrigger members and brackets to provide a suspension with an increased lateral distance between the spring members on opposite sides of the vehicle. Parallelogram stabilization of each axle is provided by a torque rod mounted at the point of attachment of the bolster beam to the axle with a torque rod having an offset and extending forwardly to a hanger assembly mounted in offset fashion to avoid interference with the vertical deflection of the bolster beam. The assembly accommodates air springs with vehicle frames that extend relatively low, such as below the top of the wheels, by underslinging the axle below the bolstem beam, and providing the outrigger members fore and aft of the wheels.

13 Claims, 15 Drawing Figures

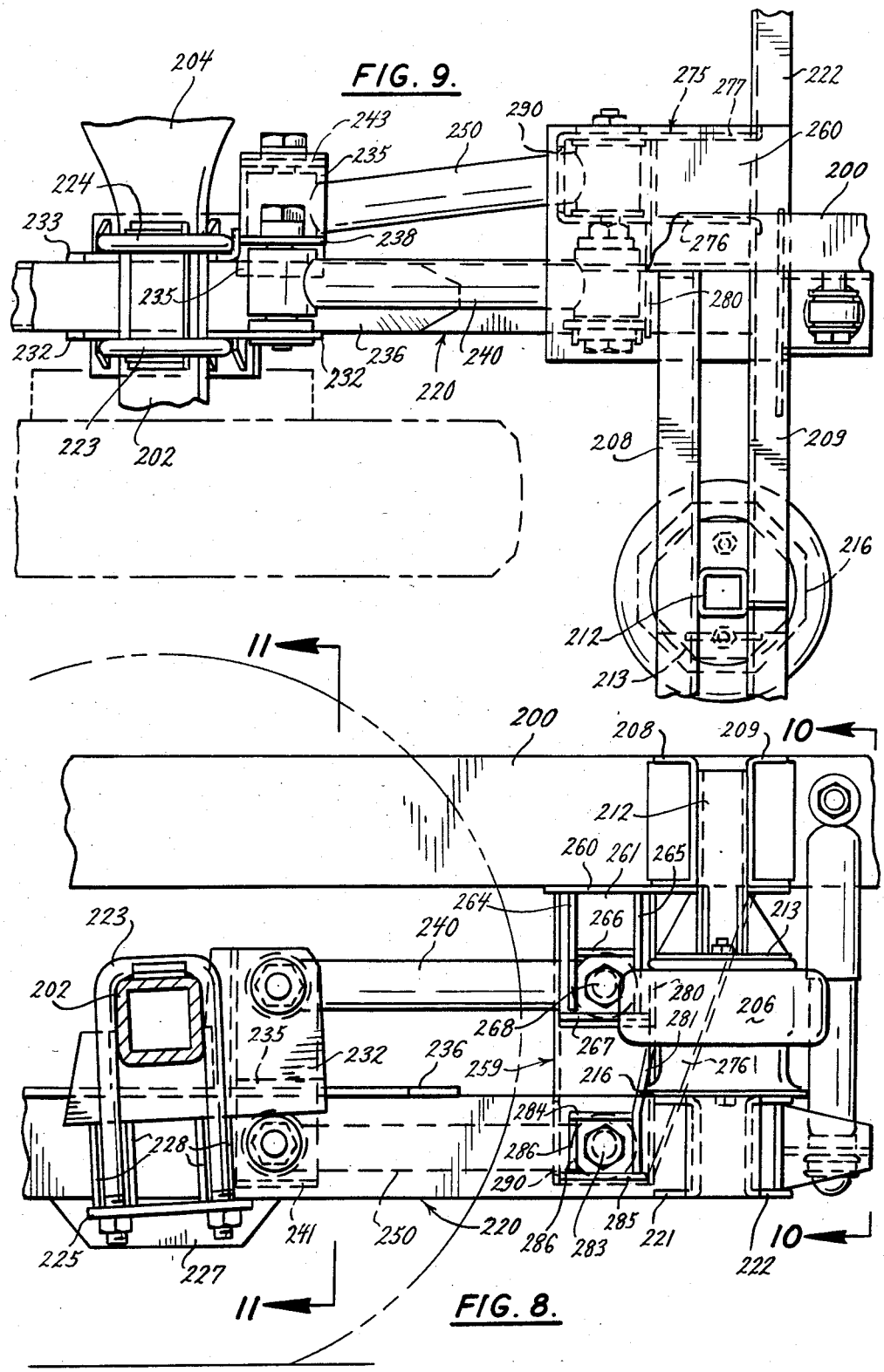

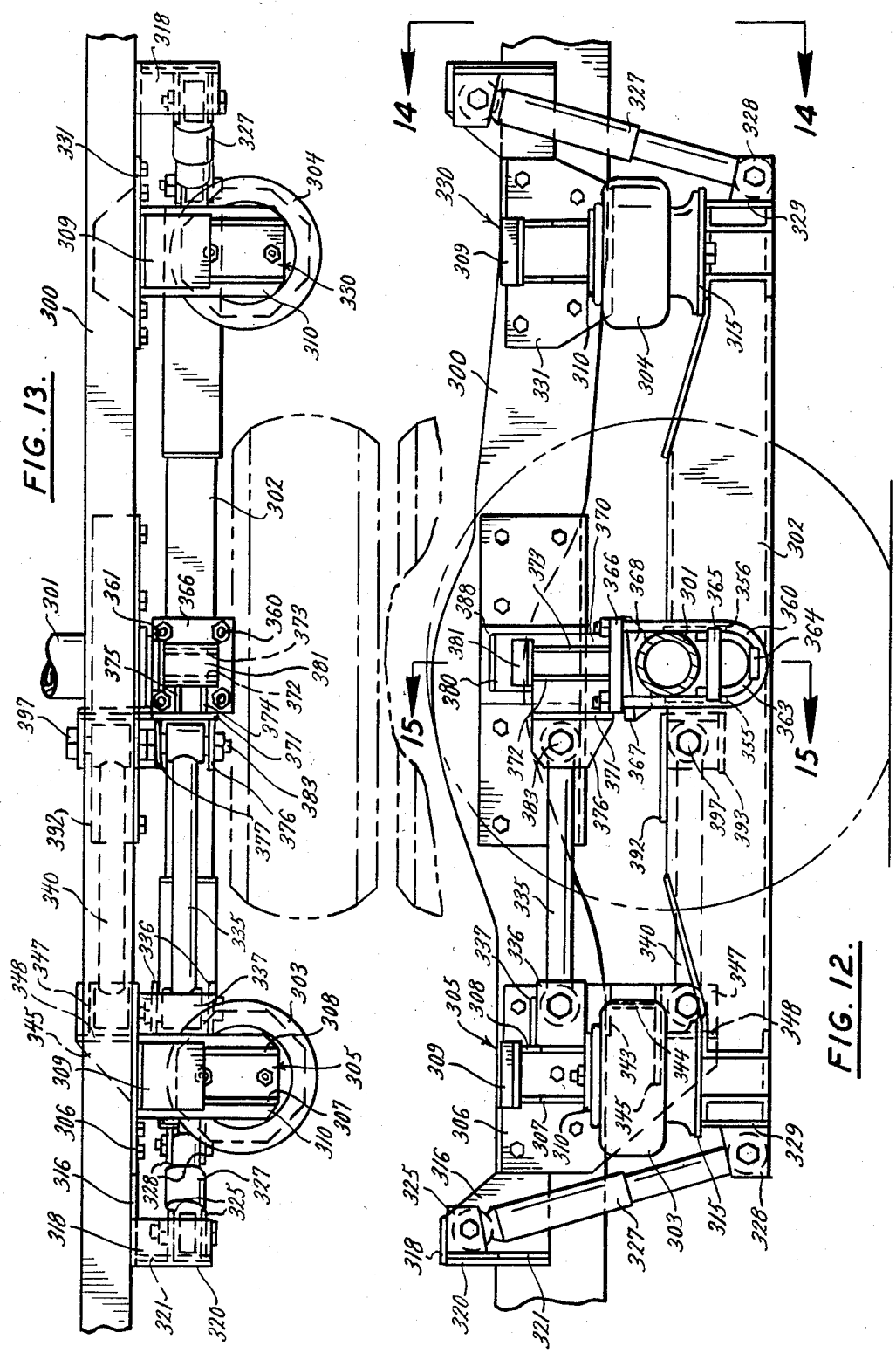

4,596,402

WIDE BASE AIR SPRING SUSPENSION WITH UNITIZED PARALLELOGRAM STABILIZATION

BACKGROUND AND SUMMARY

This is a continuation-in-part of application Ser. No. 502,496, filed 8/29/83, now U.S. Pat. No. 4,529,224, which is a continuation of Ser. No. 266,006, filed 5/21/81, now abandoned.

One of the jobs of any suspension system is to mount a vehicle chassis to one or more axles with as wide a base as possible to enhance the stability of the chassis. At the same time, the suspension must mount to the chassis at one of its reinforced frame members to provide sufficient strength to support what can be very heavy loads. For most heavy duty vehicles, the undercarriage of the chassis generally takes the form of a rail type frame which extends longitudinally along the outboard sides of the chassis with one or more axles extending transversely underneath the frame members. The common practice in the art is for one portion of the suspension to be fixedly secured to the rail frame member, a second portion of the suspension to be fixedly secured to the axle, with one or more spring members and shock absorbers extending between the suspension members and frame. Almost without exception, the spring member is aligned with the rail frame member. Thus, the location of the frame predetermines the width of the base of support provided by the suspension.

The practice in the art of positioning the spring directly beneath the center line of the rail frame members also placed constraints on the minimum height of the vehicle and maximum spring movement and hence load capacity. As can be appreciated, sufficient space must be provided between the rail frame member and the axle for mounting of the spring member and the movement of the spring from an unloaded to a fully loaded condition with some travel remaining to absorb shocks encountered during vehicle travel. As the space allowed for total spring movement is increased, the minimum height of the vehicle must be increased for any predetermined wheel and axle combination. While the capacity of the vehicle may be increased by providing increased stiffness or resistance to spring deflection, this results in a stiffer suspension action and hence a rougher ride.

Any suspension which is designed for use with a steering axle has still further factors to contend with, as it must not interfere with wheel movement throughout the turning radius, be somewhat more compact to accommodate the space required for the engine and transmission, and also provide a somewhat greater amount of stabilization because of the increased stresses encountered by a steering axle.

To solve these and other problems in the prior art, applicant has succeeded in developing a suspension system for both drive and trailer axles as well as steering axles which permits mounting of the springs outboard from the longitudinal rail frame members of the chassis. In the embodiment for drive or trailer axles, a bolster beam with an axle seat is clamped to the axle, which has two rail members extending in outrigger fashion, one on either side of the axle. Rail type bracket members similarly extend in outrigger fashion from the rail frame of the chassis and are aligned with the bolster beam outrigger members. These rail frame brackets may be connected at their outer ends to the wheel housing or other portion of the chassis available for mounting. Air springs are thus mounted between the bolster beam and the outrigger bracket members at a point somewhere near the center line of the wheels.

As can be appreciated, this provides a significantly wider base of support for the chassis and a base which coincides with the center line of the point of contact of the vehicle at each side thereof. Additionally, an offset hanger and torque rod assembly provide parallelogram stabilization of the axle which maintains the pitch of the axle constant as it deflects vertically during vehicle travel and which resists twisting of the axle as the brakes are applied. Furthermore, the dimensions and travel distance for the spring may be selected independently of the distance between the axle and frame, as long as the axle is not permitted to contact the frame during operation. As the springs are generally out in the wheelhouse area of the chassis, they can be increased in size through their cross-sectional area. Thus, this suspension provides a much wider base of stabilization both from side to side and fore to aft, and offers increased load carrying capacity with a smoother and safer ride.

In the embodiment applicant has developed for the steering axle, a novel stool type axle seat which bolts directly to the axle and has an outrigger member extending beyond the rail frame of the chassis to mount a spring within the wheelhouse area. An outrigger bracket attaches directly to the rail frame of the chassis and extends upwardly above the stool type axle seat and aligned therewith to provide the mounting for the other end of the air spring member. Thus, the air spring mounts wholly outside the vehicle chassis frame and within the wheelhouse area. The stool type axle seat also provides a mounting position for a sway bar, a shock absorber, and brackets between which bushings extend for connecting a pair of torque rods to provide parallelogram stabilization. All of these functions are provided by this single, integrally formed stool type axle seat which has sufficient clearance to accommodate the wheel movement required of a steer axle. Its compact construction provides ease in installation and maintenance in addition to providing connection points for a number of other suspension components. This unique design further provides the wide base offered in applicant's other embodiment with its related advantages of greater capacity, smoother and safer ride, and greater stability. Applicant's wide base design is particularly suited to taller types of heavy duty vehicles, such as double decker buses which can experience uneven, changing loading at greater distances from the axles of the vehicles, resulting in serious stability problems in a vehicle carrying a very fragile cargo.

With the present arrangement, it has been possible to put the two radius rods in close proximity with one almost directly above the other, even with the axle underslung. Furthermore, the rods are both near the location of the wheels where they can most efficiently transmit the forces driving the vehicle forwardly (i.e., to the left in the views), or the braking forces. This arrangement permits the upper radius rod to be substantially vertically aligned with the main frame and the bolster beam. The lower beam is set only a little to one side of the bolster beam, but far enough below the upper radius rod to give a good parallelogram action and strength. The arrangement is superior to the arrangement wherein one of the radius rods is located near the middle of the axle, and served for both sides of the vehicle. Such arrangement has a tendency to let the axle rock a small amount as between one side and the other side of the vehicle, and in so doing modifies and interferes with the parallelogram action. In other words, one arrangement assures that the pitch of the axle will remain substantially unchanged as the vehicle travels over an irregular surface.

Also, with one of the present arrangements, the drive from the wheels to the vehicle is by pulling through the radius rods, rather than pushing. Some of the features of this arrangement can be employed with the radius rods extending forward from the axle.

A fuller understanding of applicant's invention may be gained by referring to the drawings and description of the preferred embodiment which follows.

In former constructions such as that shown in the Zoltok U.S. Pat. No. 3,565,456, the arrangement clearly cannot be used with an underslung axle mount. The present arrangement, therefore, eliminates the necessity of having what Zoltok calls a bogey or extension of the frame well above the axle. Also Zoltok has no apparent way of relating the radius rods directly to the bolster beam arrangement. See also the Raidel U.S. Pat. No. 4,181,323.

The present arrangement permits the use a unitized parallelogram arrangement with wide based air springs. It permits the bolster beam, and hence the air springs, to be located ahead of and to the rear of the main diameter of the wheel.

BRIEF DESCRIPTION OF THE DRAWINGS

FIG. 8 is an elevation of the rear half of one side of a modified arrangement;

FIG. 9 is a top plan of FIG. 8;

FIG. 12 is a side elevation of an additional modification;

FIG. 13 is a top plan view of FIG. 12;

DETAILED DESCRIPTION OF THE PREFERRED EMBODIMENT

Figure 1:
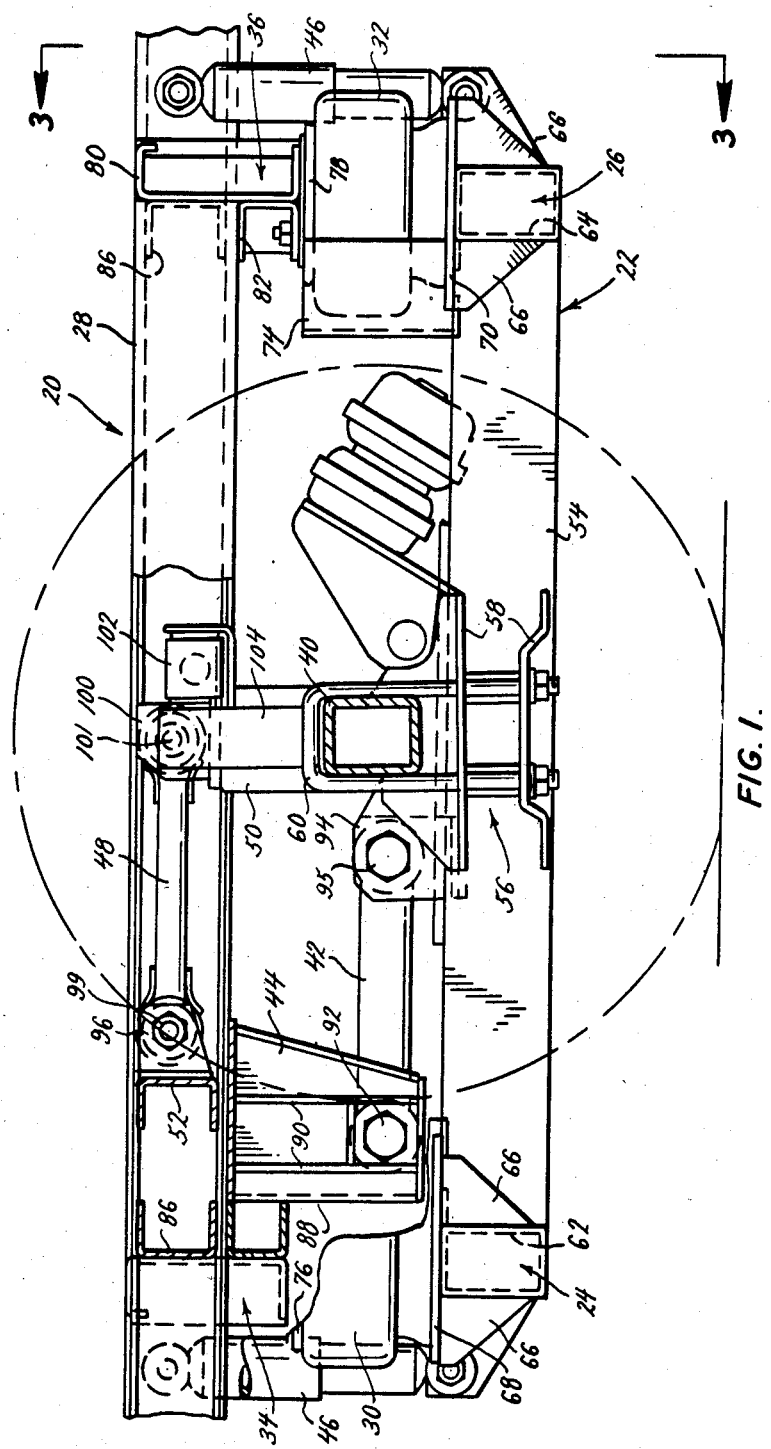
FIG. 1 is a side view of applicant's wide base air spring suspension for use with a trailer axle.
Figure 2:
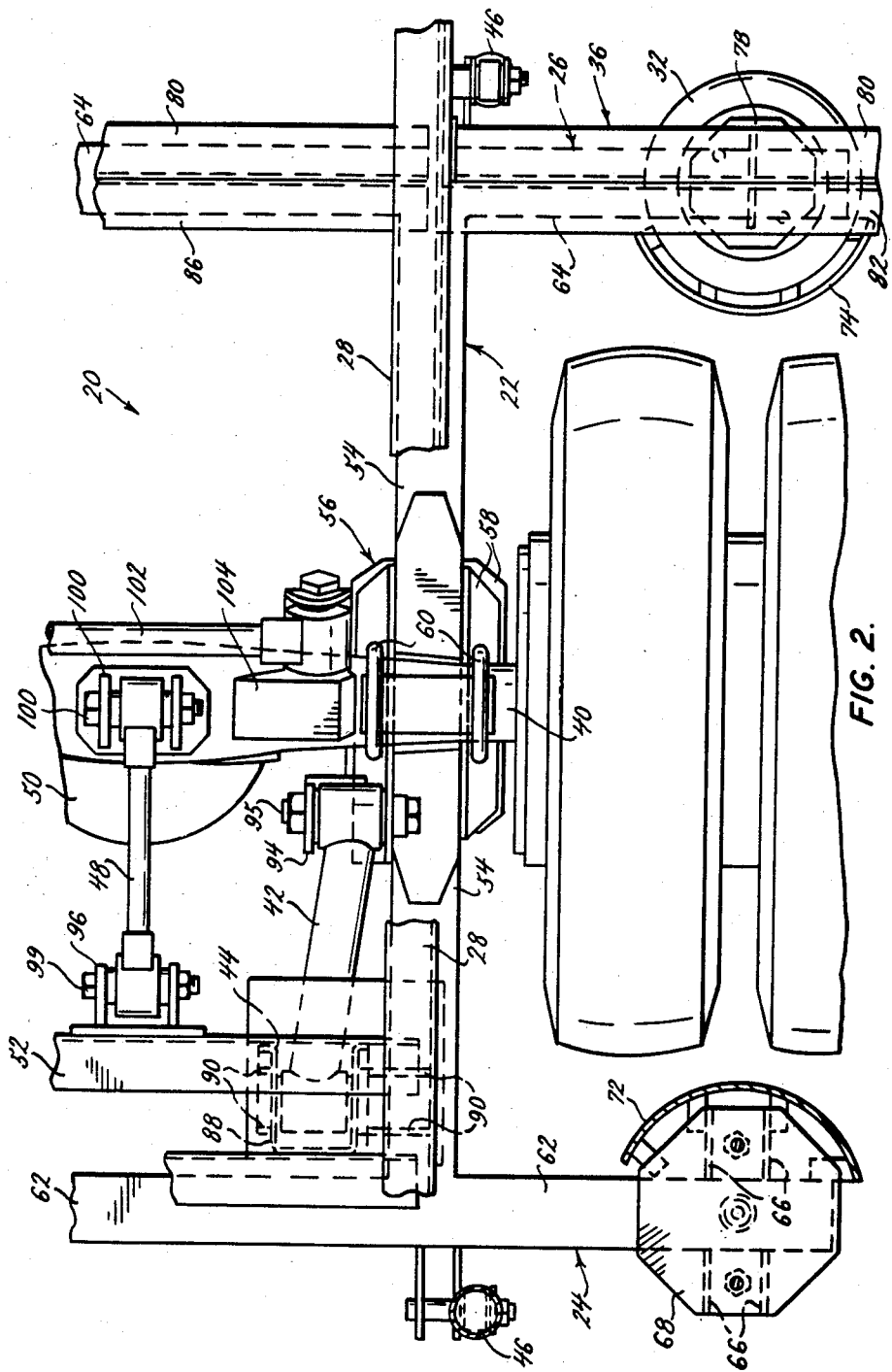
FIG. 2 is a top view of the suspension shown in FIG. 1.
Figure 3:
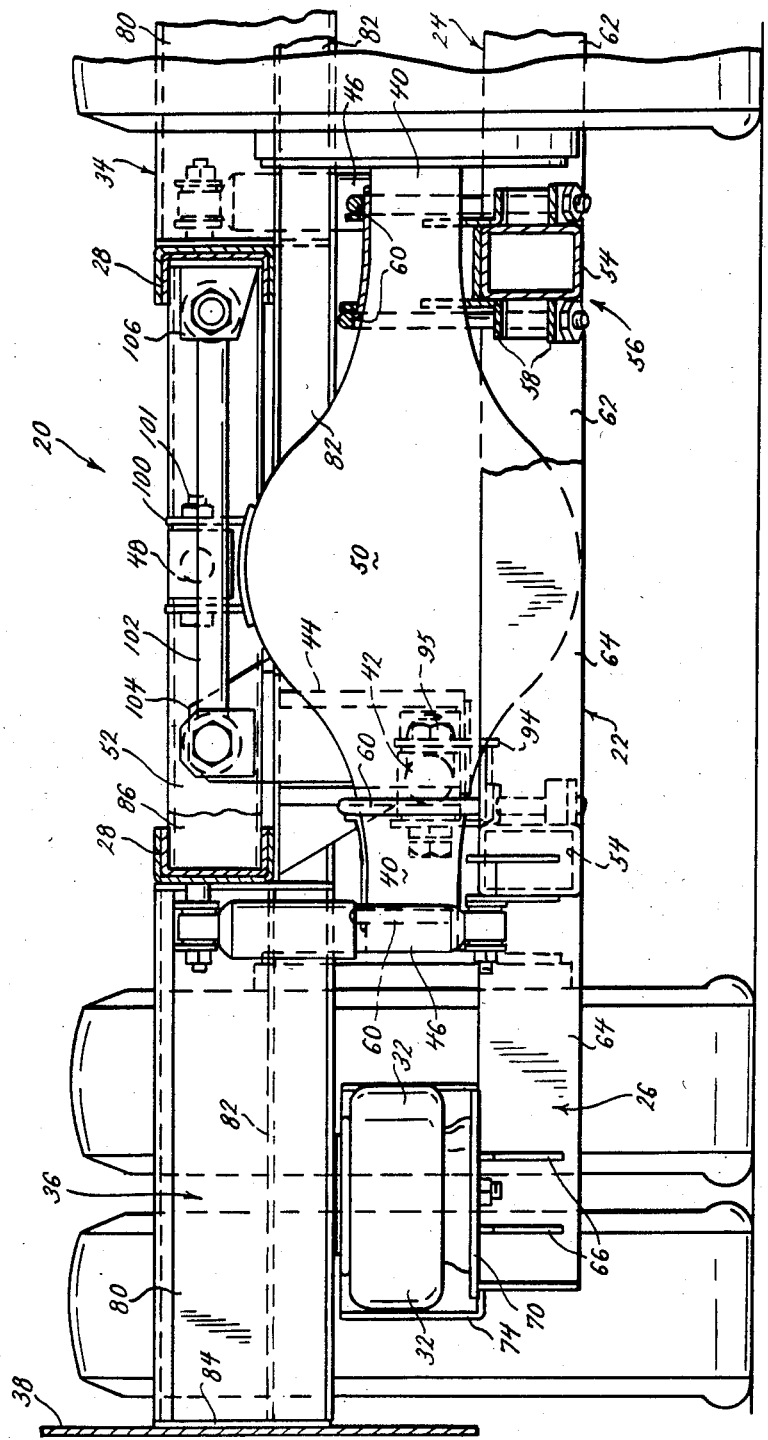
FIG. 3 is a rear view of the suspension shown in FIG. 1.

Applicant's first embodiment of his wide base air spring suspension 20 is shown in FIGS. 1-3 and generally includes a bolster beam assembly 22 with outrigger members 24, 26 extending laterally outboard of the upper rail frame 28. The outrigger members 24, 26, form part of the continuous rails which extend transversely underneath the vehicle and attach to a duplicate suspension (shown in FIG. 3) on the opposite side of the vehicle. As can be appreciated, each side of the vehicle requires a separate suspension system, and it is to be understood that applicant is describing in detail only one such suspension. Near the outer extremity of outrigger members 24, 26, air springs 30, 32 are mounted and extend between the outrigger members 24, 26 and corresponding frame extension members 34, 36 extending outwardly from upper rail frame 28 and aligned with the outriggers 24, 26. Frame extension members 34, 36 are secured to the wheel well 38 at their outer extension for added support.

Axle 40 is bolted to bolster beam assembly 22 near its midpoint and a torque rod 42 (also known as a radius rod) is pivotally attached to and extends between bolster beam assembly 22 and a hanger 44, the hanger 44 being offset from bolster beam assembly 22 for clearance purposes and to accommodate increased forward placement of air spring 30. One or more shock absorbers 46 extend between bolster beam assembly 22 and upper rail frame 28 to further dampen the suspension system. A second torque rod 48 (or radius rod) is pivotally attached to and extends between the rear axle housing 50 and a cross frame member 52 to complete the parallelogram stabilization for the axle 40. As is apparent from the drawings, the air springs 30, 32 are mounted substantially outboard from the upper rail frame 28 and provide an increased lateral distance between the corresponding air springs (shown in FIG. 3) on the opposite side of the vehicle as well as increased fore to aft separation of air springs 30, 32. Applicant will now describe his first embodiment 20 in more detail.

As shown in FIG. 1, the bolster beam assembly 22 includes a longitudinal beam member 54 which runs directly below upper rail frame 28 and has an axle seat 56 near its midpoint. Axle seat 56 includes upper and lower bracket members 58 with U-bolts 60 fastening axle 40 thereto. Outrigger members 24, 26 include rectangularly shaped rails 62, 64 which extend transversely and parallel axle 40 across the width of the vehicle. Rectangular rails 62, 64 are secured such as by welding at the forward and rearward ends of longitudinal beam member 54. Near the outboard end of each outrigger member 24, 26, an air spring is mounted with strengthening webs 66 extending between base plates 68, 70 and rectangular rails 62, 64, respectively. Around each air spring 30, 32 a shield 72, 74 is mounted to prevent damage to the air springs 30, 32 as might be caused by rocks or other debris being thrown by the tires during vehicle use. Shields 72, 74 are secured to and extend upwardly from base plates 68, 70 to top plates 76, 78.

Frame extension members 34, 36 include a taller C-shaped frame member 80 which is attached to and extends outwardly from upper rail frame 28 and a smaller C-shaped frame member 82 bolted to the top of plate 78 and extending the full width of the vehicle to the suspension on the opposite side thereof underneath upper rail frame 28 and the corresponding upper rail frame (shown in FIG. 3) on the opposite side of the vehicle. An end plate 84 or other similar bracket or the like may be used to secure frame extension members 34, 36 to the outboard wall of the wheel housing, as is known in the art. As is best shown in FIG. 3, another C-shaped cross beam 86 extends between upper rail frame 28 and the corresponding upper rail frame on the opposite side of the vehicle. This cross beam 86 helps strengthen the frame 28 at the point of attachment of frame extension members 34, 36.

A hanger assembly 44 is secured to and suspended from upper rail frame 28 inboard of the longitudinal center line thereof and includes a U-shaped bracket member 88 and a plurality of strengthening webs 90. This is best shown in FIG. 2. An eccentric bolt 92 is used to pivotally secure an end of torque (or radius) rod 42 which is formed at an angle as shown in the drawings. The axle seat brackets 58, an inboard mounting bracket 94, and bushing 95 provide the mounting for the opposite end of torque rod 42, such that the torque rod extends between a fixed frame member or hanger 44 and the bolster beam assembly 22. A center torque (or radius) rod 48 is similarly pivotally mounted at its ends with mounting bracket 96 secured to cross beam member 52 and mounting bracket 100 mounted on the top of rear axle housing 50, and bushings 99, 101. The two torque rods 42, 48 form a parallelogram to maintain the pitch of axle 40 as the tire and wheel deflect during vehicle movement. A sway bar 102 has an end pivotally mounted to a mounting block 104 welded or otherwise secured to the sloping surface of rear axle housing 50 with its other end rotatably mounted to a mounting bracket 106 mounted to the inside of the upper frame member on the opposite side of the vehicle. This is best shown in FIG. 3.

Figure 5:
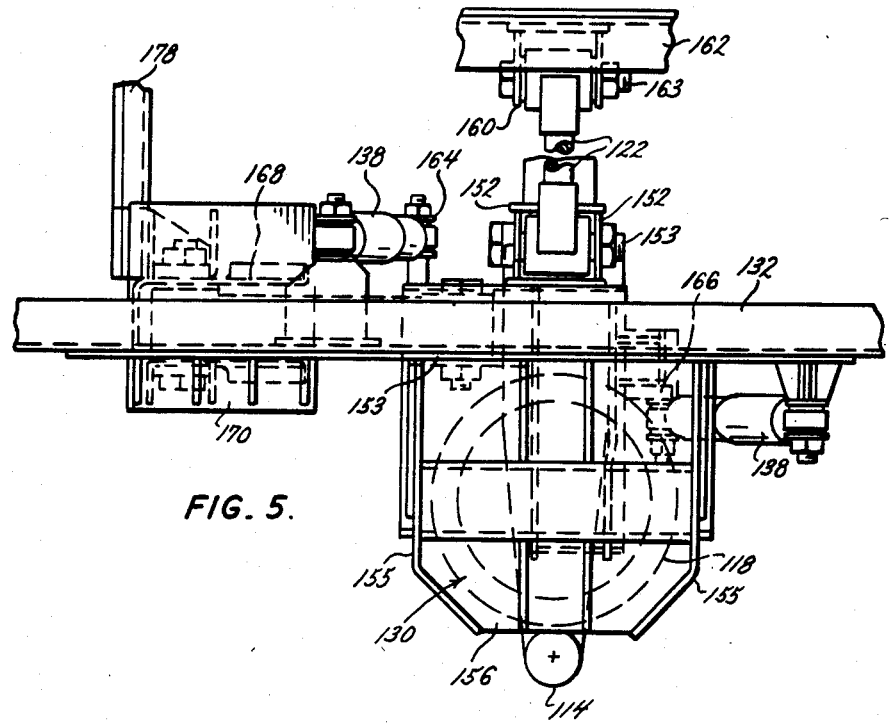
FIG. 5 is a top view of the suspension shown in FIG. 4.
Figure 4:
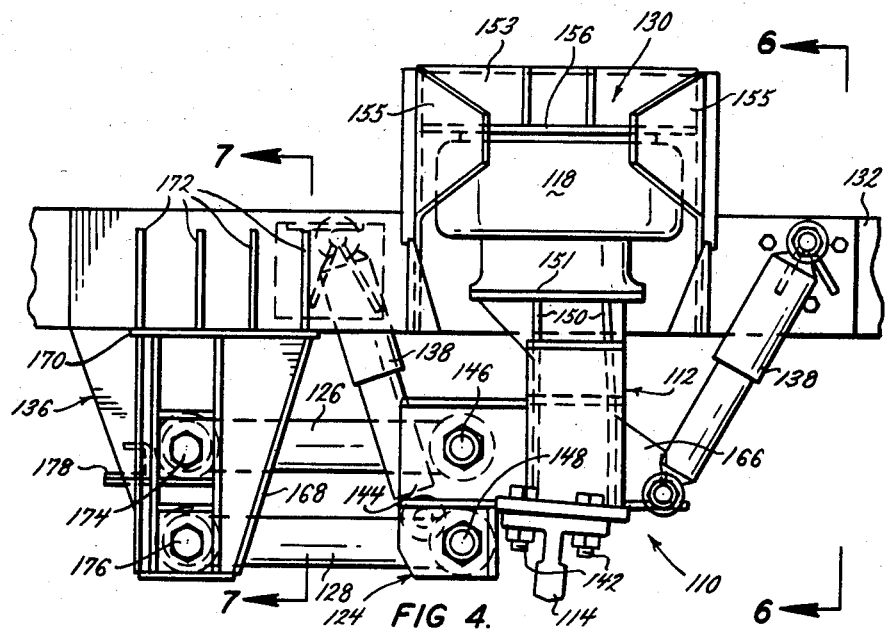
FIG. 4 is a side view of a second embodiment of applicant's suspension for use with a steer axle with the tire and wheel not shown.
Figure 6:
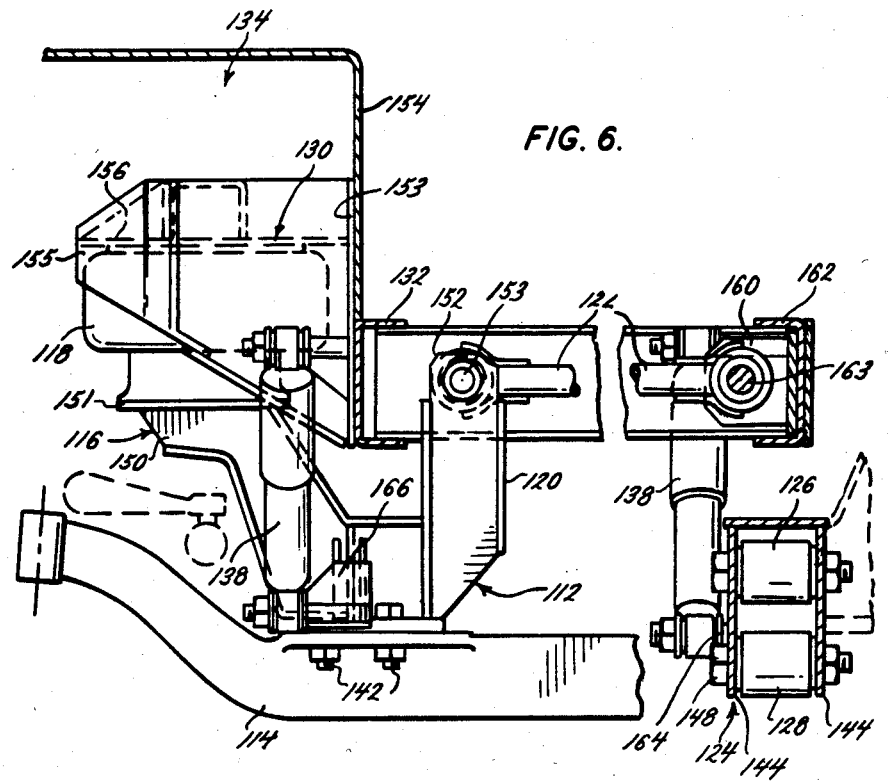
FIG. 6 is a rear view taken along the plane of line 6—6 in FIG. 4.

Applicant's second embodiment 110 is shown in FIGS. 4–7 as used with a steering axle to provide the same benefits and features in a compact construction with clearances for movement of the steering gear. As is best shown in FIG. 6, an integrally formed stool type axle seat 112 bolts to axle 114 and has an outrigger member 116 for supporting the base of an air spring 118 with an inboard extension 120 for pivotally attaching to a sway bar 122. As is shown in FIG. 4, the stool type axle seat 112 also has a lower bracket assembly 124 for pivot- ally securing an end of torque rods 126, 128. An upper spring bracket 130 is attached to and extends outwardly from a frame member 132 and the inside of wheelhouse 134 for mounting the upper end of air spring 118. A hanger bracket 136 is secured to and extends downwardly from frame member 132 and provides for the pivotal mounting of the forward end of torque rods 126, 128. Shock absorbers 138 are mounted to the stool type axle seat 112 and various brackets are secured to frame member 132. As is seen from this general description, applicant's second embodiment 110 provides for the outrigger mounting of air springs 118 with an integrally formed, compact stool type axle seat 112, with parallelogram stabilization of the axle 114 by torque rods 126, 128 also mounted to axle seat 112 with dampening provided by shock absorbers 138 secured at an end to axle seat 112, as well. Sufficient room is provided for movement of various steering carriage members as partially shown in dotted lines in FIG. 6. Having generally described applicant's second embodiment 110, more detailed description of the various elements thereof follow.

As shown in FIGS. 4–6, the stool type axle seat 112 is bolted to steering axle 114 by bolts 142, with lower bracket assembly 124 having a pair of forwardly extending bracket members 144 which are spaced apart to mount between them an end of each torque rod 126, 128 with bushings 146, 148. Similarly, outrigger member 116 includes a pair of outrigger bracket members 150 which are attached to and support bottom plate 151 of air spring 118 beyond the vertical axis of rail frame member 132. Also, inboard extension 120 includes a pair of brackets 152 which are spaced apart to mount an end of sway bar 122 with bushing 153. The other end of sway bar 122 is rotatably mounted to bracket 160 which is welded or otherwise secured to the inside of rail frame member 162 by bushing 163 at the opposite side of the vehicle. Axle seat 112 also has mounting brackets 164, 166 for mounting shock absorbers 138 therefrom, the shock absorbers 138 extending between axle seat 112 and rail frame member 132.

Upper spring bracket 130 includes a back plate 153 welded or otherwise secured to the inside wall 154 of wheel well 134 with side brackets 155 extending outward to surround top plate 156 and a substantial portion of air spring 118. Brackets 155 form a spring guard to protect it from puncture by debris and the like thrown up by the tires.

Figure 7:
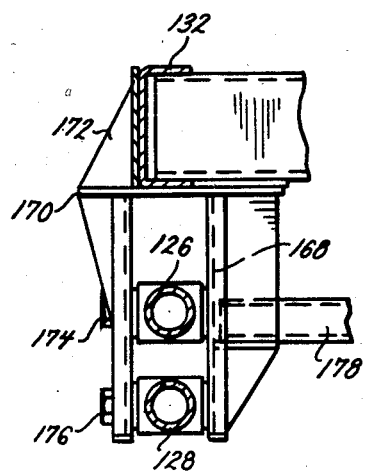
FIG. 7 is a partial cross-sectional view taken along the plane of line 7—7 in FIG. 4 and detailing the mounting of the torque rods.

A hanger assembly 136 extends downwardly from rail frame member 132 and includes a U-shaped bracket member 168 mounted to and extending beneath a top plate 170, with gusset plates 172 strengthening and supporting same. Bushings 174, 176 extend between the legs of the U-shaped bracket 168 and mount the forward ends of torque rods 126, 128. This is best shown in FIG. 4 and FIG. 7. A cross bracket member 178 is mounted to the hanger 136 and extends to a hanger (not shown) in the suspension on the opposite side of the vehicle.

The embodiment of FIGS. 8–11 shows additional features. It mounts the radius rods rearwardly instead of forwardly so that the power is applied to the chassis from the wheel in a pulling direction rather than in a pushing direction. Also it modifies the outrigger beams to give more space between the bolster beam and the frame of the vehicle, so that the radius rods can be located together and can be connected to the same hanger. This has the added advantage that it is possible to have two radius rods for each side of the vehicle, and also to have the radius rods run to the single hanger from superposed positions adjacent the axle mount.

In the drawings, as before, only one assembly has been shown, it being understood that on the other side of the vehicle a similar assembly would be shown that is a mirror image of the one illustrated.

In this embodiment the main frame is 200. The axle 202 extends from the wheel inward to a differential housing 201 indicated in dotted lines in FIG. 10 and partially shown in FIG. 11. The present mount for air springs 206 extends between the frame 200 and the axle 202.

An outrigger mount for the air spring 206 includes an extension of the frame in two channel beams 208 and 209 welded to the frame channel 200. They extend laterally therefrom at right angles sufficiently far to overlie and support the top of the air spring 206. The axis of the air spring is approximately at the midpoint between double wheels, one of which is shown in the drawings. In a single wheel vehicle, the overhang of the outrigger 208–209 may be shorter, so that the air spring and its associated parts do not project beyond the outer limits of the tire.

Near the outer ends of the two members 208 and 209, a square column 212 is welded to both beams and extends below them to receive and support a bracket 213 suitably reinforced to support the top of the air spring 206. The column 212 thus reinforces the two beams 208 and 209 and also supports the upper section of the air spring.

Figure 10:
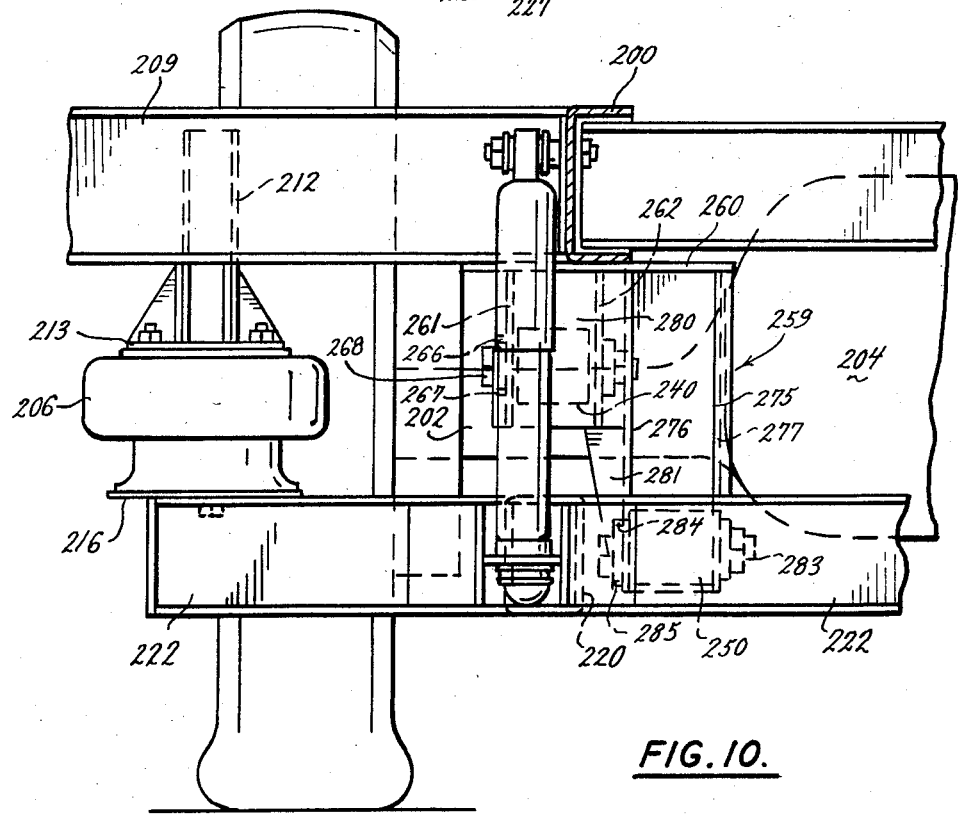
FIG. 10 is a vertical, transverse section taken on the line 10—10 at the right side of FIG. 8.
Figure 14:
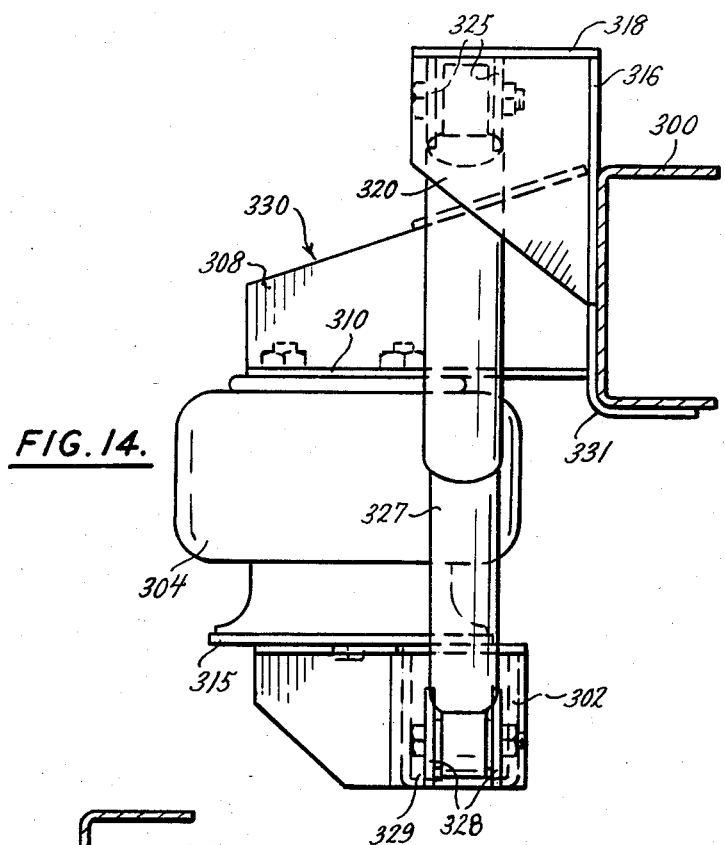
FIG. 14 is a vertical, transverse section taken on the line 14—14 at the right of FIG. 12.
Figure 15:
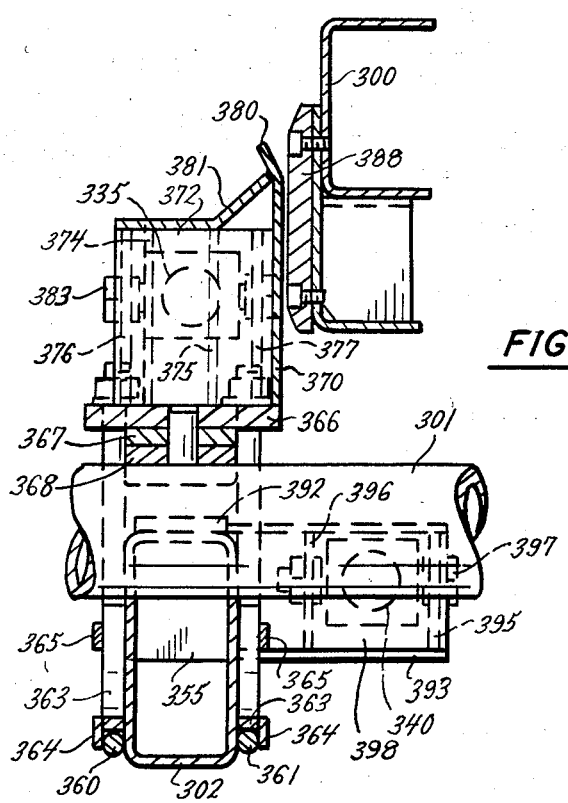
FIG. 15 is a vertical section taken on the line 15—15 through the middle of FIG. 12.

The lower part of the air spring is supported on a composite bolster, or rocker beam, 220 that can have the same general shape as that shown in the first embodiment hereof. As shown, it comprises a tubular beam member under the main frame 200, having at each of its ends two transversely extending outrigger channel beams 221 and 222. Beam 221 terminates at the beam 220. As shown in FIGS. 9 and 10, the beam 222 extends across to the other side frame of the vehicle. These outrigger beams 221 and 222 at the rear of the bolster beam 220 constitute the principal support for a plate 216 of the lower part of the air spring 206. The foregoing parts are also found for the end of the bolster beam 220 having the other air spring (not shown).

At approximately its midpoint, the bolster beam 220 is connected to the axle 202 by U-bolts 223 and 224. The U-bolts pass around the axle 202 and through two ears 225 and 226 welded on opposite sides of the rocker beam 220, as well as to braces 227, and to gussets 228. These components are welded to the beam 220.

Figure 11:
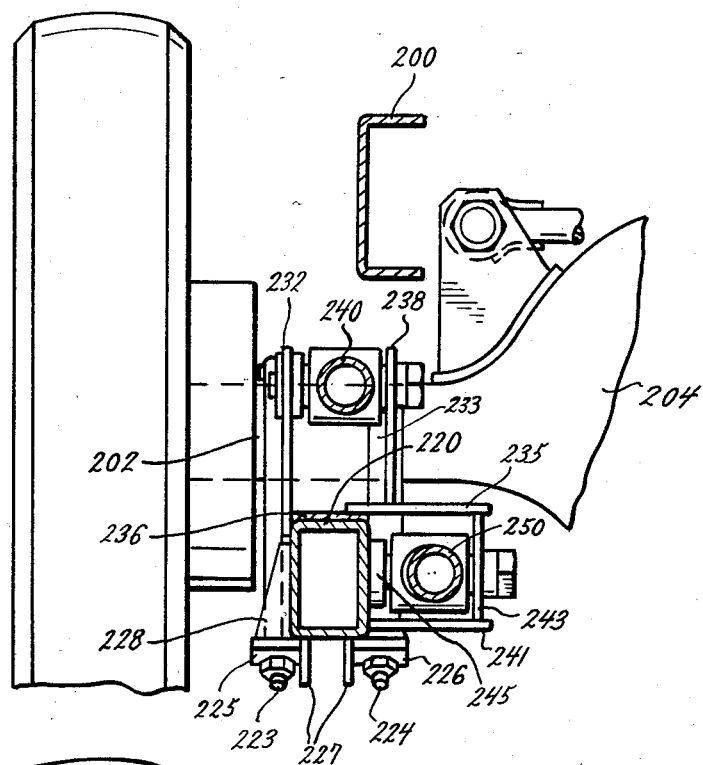
FIG. 11 is a transverse section taken on the line 11—11 toward the left middle of FIG. 8.

Also welded to the rocker beam 220 on its opposite sides are two vertical panels 232 and 233. These two plates at their bottom edges abut the tops of the gussets 228. The panel 232 projects backwardly as shown particularly in FIGS. 8 and 9 for a purpose to appear. The other plate 233 projects backwardly but is turned inwardly as shown in FIG. 9, toward the center of the chassis. A horizontal plate 235 is welded to a plate 236 that in turn is welded to the top of the bolster beam 220. The plate 235 extends inwardly from the beam 220 toward the vehicle axis (FIG. 11). It is also welded to the inturned end of the vertical member 233. A fore and aft vertical plate 238 rests on and is welded to the horizontal member 235. The vertical plates 232 and 238 thus extend upwardly in parallel relationship and, as will be explained, support the forward end of an upper radius rod 240.

Below the horizontal plate 235 there is another horizontal plate 241 projecting inwardly toward the axis of the vehicle from the buffer beam 220 and welded to it. A vertical member 243 is welded to these two plates 235 and 241, and reinforces them. An end plate 245 is also welded to the side of the rocker beam 220 opposite the vertical plate 243 and with that plate constitutes means to support an end of the other radius rod 250.

The rear ends of the two radius rods 240 and 250 are supported on a bracket hanger assembly 259 that is welded to and depends below the main frame 200. This hanger includes a horizontal rectangular plate 260 welded beneath the main frame 200 and its outrigger extension 209.

On the outer forward portion of the plate 250 there are fore and aft disposed vertical plates 261 and 262. The plate 261 is braced by vertical metal bracing strips 264 and 265 that in turn are spanned by horizontal braces 266 and 267. These braces form a square through which the rocking pin 268 for the upper radius rod 240 is mounted, the pin 268 passing through the plates 261 and 262 and having securing nuts on its inner end. Similar braces may be provided on the plate 262.

The rocking pivot for the lower radius rod 250 receives primary support from a U-shaped metal portion 275 of the hanger 259, the upper edges of which are welded to the plate 260. Its downward and forward slope (which has out-turned edges) disposes its sides 276 and 277 at the bottom forwardly to lie to one side of and below the pin 268 of the upper radius rod 240. A vertical plate 280 extends across the back edges of the plates 261 and 262 of the upper radius rod pivot, being welded to those two plates as well as to the side 276 of the U-shaped member 275. Also, a brace 281 is welded below the plate 280 and extends downwardly and inwardly to brace the U-shaped member 275 to which it also is welded. It also constitutes one edge of the rib bracing around the pivot 283 of the lower radius rod 250. That rib bracing includes also horizontal braces 284 and 285 as well as a second vertical brace 286. These surround the end of the bolt 283.

As illustrated, the two bolts 267 and 283 are eccentric to provide a final adjustment of the radius rods mountings to dispose the axle at its desired tilt. The U-shaped member 275 has an opening 290 to permit rocking of the radius rod 250 about its pivot 283.

Another advantage of the present construction is that the parallelogram mounting of the radius rods is unitized to include mountings for both of them, as their forward and rearward mountings provide in both cases the connections and support for both radius rods. The forward bracket for mounting the axle provides a pyramidal axle seat with an integral beam guide. This is evident by considering the arrangement of the axle seat as shown in FIG. 8. This bracket seat also provides for the U-bolt mounting. The same axle seat is part of the mounting bracket for the two radius rods.

A thrust rod may be arranged to limit lateral movement of the axle, as in the first embodiment. In the embodiments of FIGS. 12–15, the main frame 300 has a double drop to it fore and aft of the axle 301, a fact that limits the amount of space for the ends of a bolster beam, directly under the axle. Here the bolster beam 302 is set outside the frame, and is connected to the axle through two air springs 303 and 304 in a manner to be described.

Looking at the forward, or left-hand, spring mounting in FIGS. 12 and 13, hanger 305 underlies a plate 306 which is welded vertically onto the side of the frame 300. Two side vertical plates 307 and 308 perpendicular to the plate 306 are joined at their tops by a sloping upper plate 309, and a lower plate 310. Thus the plates 306, 307, 308, 309 and 310 are all welded into a unit.

As shown, the top of the air spring 303 is bolted to the plate 310. The lower part of the air spring is mounted on and bolted to a plate 315 that is welded to the bolster beam 302.

The hanger plate 306 also is formed with a shock absorber support. This includes a plate 316 welded to the forward edge of the plate 306 and also to the frame 300. A top plate 318 extends outwardly and is welded to the top of the plate 316. Also, two vertical plates 320 and 321 are mounted with their inner edges welded to the plate 316 and their upper edges welded to the plate 318. They in turn support two ears 325 that pivotally receive the upper end of a shock absorber 327. The lower end of the shock absorber is mounted between two ears 328 that project from a plate 329 welded across the end of the buffer beam 302.

The air spring 304 is mounted in similar fashion on the other end of the buffer beam with its upper parts held by the hanger 330. In the case of the other air spring 304, the hanger plate does not need to extend down as far as in the case of the other air spring, for reasons that will appear shortly, and so it is bent under the frame member 300.

Again reverting to the forward air spring 303 and its mounting, that mounting provides for the forward connections of two radius rods to be connected to the same hanger 305. To this end, the upper radius rod 335 is mounted as follows. The plate 308 of the hanger has two ears 336 welded to it and extending backwardly. They are also joined by a top plate 337 welded to them and to the plate 308.

The forward end of the lower radius rod 340 is mounted to one side of the upper rod and directly below the main frame 300. An upper horizontal plate 343 is welded to the frame 300, to the plate 306 and to a vertical plate 344. A lower horizontal gusset plate 345 is welded to the bottom of the plate 344 and to the plate 306. It supports a vertical plate 347 that constitutes an ear to receive one end of the pivot of the lower radius rod 340, the other end of which goes through the plate 306. The ears may be joined by a cross plate 348.

Thus the hanger can be pre-assembled into a unit to provide the means to hold the top of the air spring, the ends of the two radius rods and, if required, the shock absorber upper mounting. The bolster beam thus is supported at its two ends by the two air springs that are in turn connected to the frame 300.

The beam 302 supports the axle 301. The top wall of the beam 302 is cut out and vertical transverse plates 355 and 356 are welded on the bolster beam 302. The beam side walls are cut out to cradle the lower half of the axle 301.

U-bolts 360 and 361 are disposed on opposite sides of the bolster beam 302. Each U-bolt fits against a U-shaped block 363 that is welded to the side of the bolster beam 302. Straps 364 and 365 are also welded to the bolster beam and to the U-shaped brackets, and overlap the U-bolts to hold them firmly against the sides of the bolster beam.

The U-bolts extend upwardly to a block 366 above the axle 301 through which they pass and to which they are bolted. They press a wedge 367 and through it a second block 368 is pressed against the axle, the wedge holding the block at an appropriate angle.

Block 366 is welded to a vertical plate 370 that extends upwardly in a fore and aft direction and is bolstered by transverse plates 371, 372 and 373. The plate 371 and the plate 372 are in turn bolstered by plates 374 and 375. Swivel ears 376 and 377 project forwardly from the plate 371.

The foregoing parts are welded together at their contacts and the two ears 376 and 377 provide support for the swivel 383 of the upper radius rod 335. Thus the upper radius rod connection is unitized with the top U-bolt clamping plate 363.

The back plate 370 is vertically mounted to lie alongside the frame 300 of the vehicle and it has its upper end 380 bent outwardly. Adjacent it there is a top plate 381 that extends downwardly and outwardly. The plate 370 is designed to provide lateral axle guiding. To this end, a wear plate 388 is bolted on the outside of the frame 300. The axle may drive the plate 383 against it if the axle tends to move laterally, and thereby such lateral movement is restricted. The bent-out end 380 of the plate 370 keeps the plate 370 from digging into the wear plate in the event that one wheel goes up and the other does not.

The lower radius rod is supported from the bolster beam 302 adjacent the U-bolt mounting and in a way to dispose its rear pivot or rocking axis at the same aft distance as that of the upper rocking axis. To this end, a plate 392 is welded to the top of the bolster beam 302 and extends across to below the main frame 300. A lower plate 393 also extends from the side of the bolster beam. Both plates are joined by a vertical plate 395 and a similar plate 396 that constitutes ears to receive the back pivot 397 of the lower bolster beam. A back plate 393 reinforces the assembly.

OPERATION

The present suspensions are adapted for use on trailer axles, driving axles, or other non-steering type axles. The invention provides for an increased distance between the spring members of the suspensions on opposite sides of the vehicle over those suspensions available in the prior art, and yet uses an underslung axle. No elevated bogey is required.

Each suspension on each side of the vehicle has a bolster beam assembly bolted to the axle with outrigger members extending outwardly beyond the rail frame underneath the chassis of the vehicle to provide a mounting position for the air spring. Frame extension members extend outwardly from the rail frame to provide the upper mounting point for the air springs such that the air springs can be substantially aligned with the center line of the wheels. Moving the air springs out beyond the rail frames and into the wheel wells gains additional space and permits use of larger air springs than is possible in suspensions mounting the air spring directly beneath the rail frames. Thus, increased capacities may be accommodated and a smoother and safer ride provided through the use of larger spring members.

These systems use parallelogram stabilization of the axle to maintain the pitch of the axle as the axle deflects vertically with respect to the frame. As the bolster beam provides an increased separation between the air springs and the axle, it becomes a problem to secure torque rods of the same length and angular orientation without limiting the vertical travel of the bolster beam. To eliminate this problem, applicant has offset the hanger assembly and provided a larger torque beam with a lateral offset so that the hanger does not interfere with movement of the bolster beam. Thus, full parallelogram stabilization of the axle can be achieved in a suspension which has increased separation and longitudinal spacing as well as lateral spacing between air spring members.

In applicant's second embodiment, the air spring is mounted outside of the center line of the rail frame and into the wheel house or wheel well area which provides increased stabilization, without interfering with the movement of the steering axle or any of the supporting struts, guide arms, or other assemblies of the steering mechanism. With outboard mounting of the air spring, an air spring of increased capacity and dimension may be used to provide a safer and smoother ride; with parallelogram stabilization of the axle to prevent axle rotation as the brakes are applied and also maintain the pitch of the axle as it deflects vertically with respect to the frame which provides for a solid feel in the steering of the vehicle. With the stool type axle seat, installation is enhanced as it serves as a connection point for most of the suspension's components, including shock absorbers, torque rods, the air spring, axle, and sway bar. Furthermore, with the outrigger mounting of the air spring, an increased base of stabilization is provided as the distance between air springs on opposite sides of the vehicle is increased over those suspension of the prior art with air springs mounted directly beneath the rail frame members, as is customary.

In all embodiments, the outrigger extension mounting the top of the air spring may extend across to the outer wall of the wheel well or wheel house area and be attached thereto to help support the air spring and increase the stability of its mount.

What I claim is:

1. A suspension assembly having a spring member for supporting a vehicle chassis on at least one vehicle axle having wheels, such chassis having a frame undercarriage including at least one longitudinal frame member, that improvement comprising: means to mount the spring member outboard of the undercarriage, including a frame extension hanger for attachment to the frame and extending outwardly therefrom lengthwise beyond the limits of the wheel in outrigger fashion, a bolster beam extending inside the wheel from the axle to beyond the limits of the wheel, an axle seat mounting means for fixed attachment of the bolster beam to and below the axle, the bolster beam having a portion extending laterally outwardly therefrom beyond the limits of the wheel in outrigger fashion to line up with the frame extension hanger, the spring member being mounted to and extending between the outrigger members to thereby provide a wider base for supporting the chassis, a first radius rod and a first connection for pivotally connecting the inner end of the radius rod onto the axle mounting means, a pivotal connection between the outer end of the first radius rod for connection of the radius rod to the frame extension hanger at a point between the axle and the lateral extension on the bolster beam, and a second radius rod pivotally connected between the axle mounting means and the frame extension hanger to provide parallelogram movements of the axle and the bolster beam relative to the chassis.

2. The mount assembly of claim 1 with the second radius rod also for pivotally connecting the axle and the frame of the vehicle, the second radius rod being elevated above the first one and being of substantially the same length thereof whereby to obtain a parallelogram action, for maintaining the pitch of the axle.

3. The spring mount assembly of claim 2 wherein the second radius rod is mounted above and to one side of the first one and connected to the hanger and the attaching means for the axle and the bolster beam.

4. The assembly of claim 1, wherein the bolster beam extends longitudinally outside the vehicle frame, one radius rod being disposed inside of the bolster beam.

5. The assembly of claim 1, wherein the bolster beam extends longitudinally outside the vehicle frame, the one radius rod being disposed outside the bolster beam, and the other radius rod being in vertical alignment with the vehicle frame.

6. The combination of claim 1 wherein the bolster beam extends fore and aft of the axle, with outrigger means at each end of the bolster beam and the frame, and a spring correspondingly arranged at each end of the bolster beam.

7. The combination of claim 6 wherein the springs are air springs.

8. The combination of claim 6, wherein the bolster beam, the axle and the outriggers of the bolster beam, the springs, and the hanger of the two radius rods and their connections, are joined together as a unit.

9. The combination of claim 8, wherein there is a hanger for each spring, the two radius rods and both of their outer connections being connected to one hanger, the two springs being mounted on their respective hangers, the two hangers thereby providing for the mounting of the assembly onto the frame.

10. The combination of claim 9 with means on the axle seat engageable with the frame to restrict lateral movement of the assembly with respect to the frame.

11. The assembly of claim 9, with means on each hanger for connection thereto of one end of a shock absorber, with means to attach the other ends of the shock absorber to the bolster beam.

12. The suspension assembly of claim 1 wherein there is a hanger for attachment to the longitudinal frame member and to depend below the same laterally of the bolster beam so as not to interfere with the rise and fall of the beam, one radius rod being pivotally connected to the said hanger and being laterally displaced from the bolster beam at said outer end.

13. The combination of claim 1 wherein the connections between the two radius rods and the axle are unitary with the axle seat.

* * * * *